United States Patent [19]
Veeravalli et al.

[11] Patent Number: 6,097,956
[45] Date of Patent: Aug. 1, 2000

[54] ACCURATE CALCULATION OF THE PROBABILITY OF OUTAGE FOR THE CDMA REVERSE LINK

[75] Inventors: Venugopal Veeravalli, Ithaca, N.Y.; Andrew Sendonaris, Houston; Nikhil Jain, Plano, both of Tex.

[73] Assignee: Nortel Networks Corporation, Montreal, Canada

[21] Appl. No.: 08/957,278

[22] Filed: Oct. 24, 1997

[51] Int. Cl.[7] .................................................... H04Q 7/20
[52] U.S. Cl. ......................... 455/446; 455/453; 455/452
[58] Field of Search .................................. 455/453, 452, 455/522, 69, 525, 446

[56] References Cited

U.S. PATENT DOCUMENTS

| | | | |
|---|---|---|---|
| 5,058,200 | 10/1991 | Huang et al. | 455/33 |
| 5,193,109 | 3/1993 | Chien-Yeh Lee | 379/60 |
| 5,524,136 | 6/1996 | Bar-Noy et al. | 379/59 |
| 5,551,057 | 8/1996 | Mitra | 455/33.1 |
| 5,561,841 | 10/1996 | Markus | 455/33.1 |
| 5,732,328 | 3/1998 | Mitra et al. | 455/69 |

OTHER PUBLICATIONS

Audrey M. Viterbi and Andrew J. Viterbi, "Erlang Capacity of a Power Controlled CDMA System," IEEE Journal on Selected Areas in Communications, vol. 11, No. 6, Aug. 1993, pp. 892–900.

Mohamed A. Landolis, Venugopal V. Veeravalli and Nikhil Jain, "New Results on the Reverse Link Capacity of CDMA Cellular Networks," Bell Northern Research and ECE Department of Rice University, (9 pages).

*Primary Examiner*—Wellington Chin
*Assistant Examiner*—Sheila Smith
*Attorney, Agent, or Firm*—John D. Crane; Daniel E. Venglarik; Andrew J. Dillon

[57] ABSTRACT

Accurate calculation of the probability of outage for a cell within a CDMA network is utilized to relate cell coverage to cell capacity. Based on a desired probability of outage, the coverage of the cell may be calculated for an average number of users within the cell. The calculation is independent of the admission policy employed to achieve the specified average number of users. The resulting closed form expression for the tradeoff between coverage and carried traffic allows an optimal design of a CDMA network.

17 Claims, 3 Drawing Sheets

ACCURATE CALCULATION OF THE PROBABILITY OF OUTAGE FOR THE CDMA REVERSE LINK

BACKGROUND OF THE INVENTION

1. Technical Field

The present invention relates generally to wireless digital communications systems and in particular to wireless digital communications systems employing code division multiple access. Still more particularly, the present invention relates to defining cell coverage as a function of capacity within a code division multiple access wireless digital communications network.

2. Description of the Related Art

Digital telecommunications networks are increasingly based on code division multiple access (CDMA), a form of spread spectrum multiple access. In contrast to frequency division multiple access (FDMA), in which the available spectrum is allocated among multiple users by frequency, and time division multiple access (TDMA), in which the available spectrum is allocated among multiple users by time, users all share a common spectral frequency allocation over the time that they are active. Each active signal within a CDMA system occupies all of the bandwidth all of the time. Separation of the signals depends on each being carried by an underlying waveform which is nearly orthogonal to all other signals. Digital codes are employed in CDMA to form the underlying quasi-orthogonal waveforms. Each user within a CDMA systems has a unique long period digital sequence called a pseudorandom sequence, which appears random to a casual observation of insufficient duration. This sequence is usually either (1) combined directly with the information stream to be sent, as in direct sequence transmission, or (2) used to select pre-planned spectrum channels among which the transmission is hopped, as in frequency hopping transmission.

CDMA provides a degree of protection against frequency-selective fading and reduces multipath interference. Signals which arrive late at the receiver do not match the portion of the code currently being utilized to decode the signal, and are thus rejected as interference. CDMA is also excellent in discriminating against noise. However, all signals within a given spectrum other than the signal of interest are treated as noise by a CDMA unit. Therefore, as more users attempt to communicate via a particular spectrum, performance for all users of that spectrum gradually degrades. The capacity of a CDMA cell is thus defined based on the level of perceived noise from other users above a background noise level of mainly thermal origin.

In CDMA systems, the coverage of a cell depends on the number of users in the cell. The reason is that as the number of users in a cell increases, the ability of a given mobile unit in the cell to maintain an acceptable link with its base station decreases. Therefore, an accurate prediction of cell coverage—the size and boundaries of a cell—as a function of cell capacity is essential in CDMA network design and deployment. It would be desirable, therefore, to derive a relationship between cell coverage and cell capacity for accurate calculation of the probability of call outage. It would further be advantageous to separate the problems of call outage and call blocking in deriving a relationship between coverage and capacity, relating coverage to an average number of users for a given upper bound on outage probability to allow prediction of coverage for a projected capacity, irrespective of the admission policy utilized to achieve that capacity or the resulting call blocking probability. It would further be desirable to precisely define the limit of the average number of users a cell may support as the cell coverage shrinks to zero. It would further be advantageous to derive a relationship between coverage and capacity as described above without consideration of the effects of soft handoff.

SUMMARY OF THE INVENTION

It is therefore one object of the present invention to provide an improved wireless digital communications systems.

It is another object of the present invention to provide an improved wireless digital communications system employing code division multiple access.

It is yet another object of the present invention to provide a method and apparatus for defining cell coverage as a function of capacity within a code division multiple access wireless digital communications network.

The foregoing objects are achieved as is now described. Accurate calculation of the probability of outage for a cell within a CDMA network is utilized to relate cell coverage to cell capacity. Based on a desired probability of outage, the coverage of the cell may be calculated for an average number of users within the cell. The calculation is independent of the admission policy employed to achieve the specified average number of users. The resulting closed form expression for the tradeoff between coverage and carried traffic allows an optimal design of a CDMA network.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
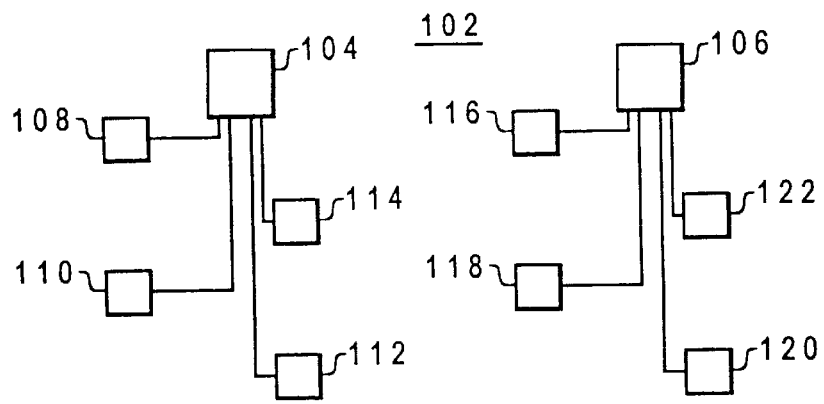
FIG. 1 depicts a block diagram of a portion of a digital communications network in which a preferred embodiment of the present invention may be implemented.

With reference now to the figures and in particular with reference to FIG. 1, a block diagram of a portion of a digital communications network in which a preferred embodiment of the present invention may be implemented is depicted. Network 102 includes a plurality of switches 104 and 106.

Switches 104 and 106 may include processors and be capable of functioning as data processing systems. Connected to each switch 104 and 106 are sets of repeaters or base transceiver stations (BTS) 108–114 and 116–122, respectively. Each BTS 108–122 defines a cell within the overall network. Although only four BTS's are depicted connected to each switch, those skilled in the art will recognize that many more BTS's may be routed to each switch within network 102.

Figure 2:
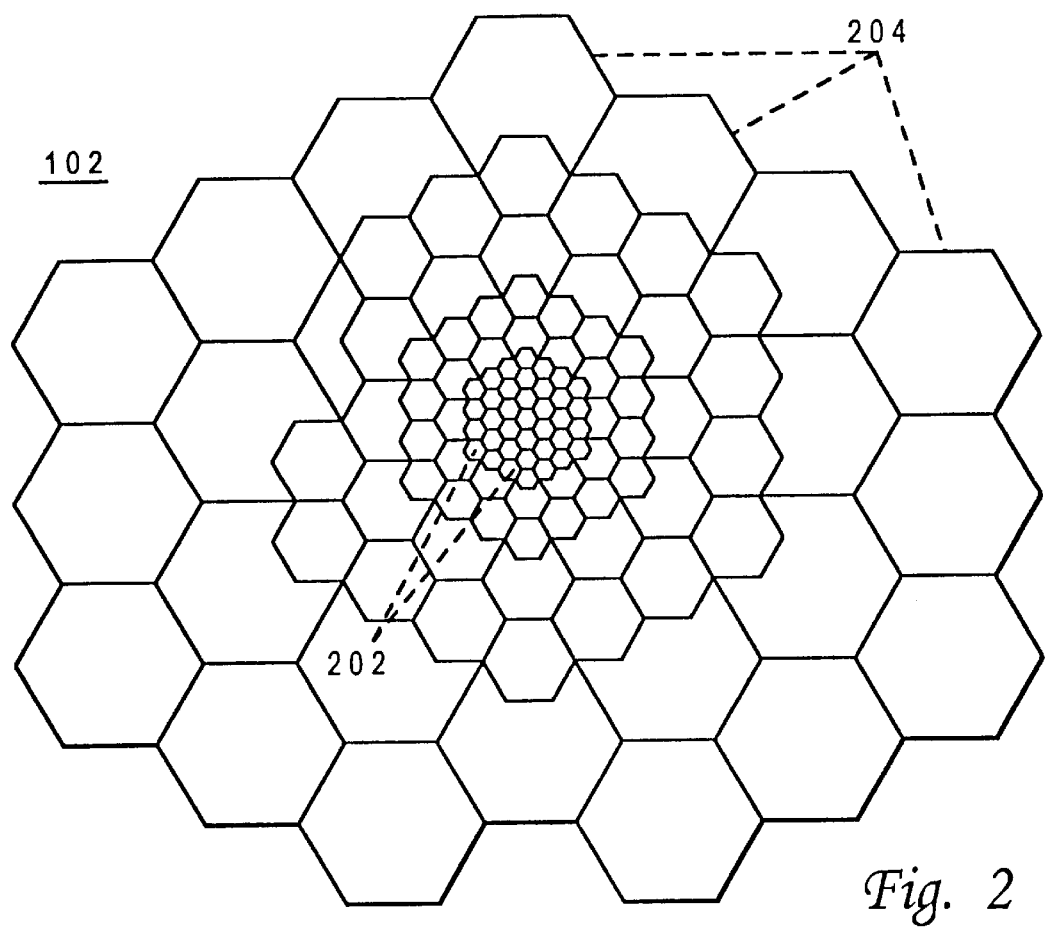
FIG. 2 is a diagram of a cell arrangement within a digital communications network in accordance with a preferred embodiment of the present invention.

Referring to FIG. 2, a diagram of a cell arrangement within a digital communications network in accordance with a preferred embodiment of the present invention is illustrated. Network 102 includes a plurality of cells, with cells 202 in urban areas smaller and denser than cells 204 in rural areas. The cell locations and boundaries are defined, as is the number of switches in network 102. However, cells are routed to specific switches within the network in such a manner as to minimize the number of expected inter-switch handoffs of mobile subscriber units passing between cells given the traffic flow and terrain within network 102.

Figure 3:
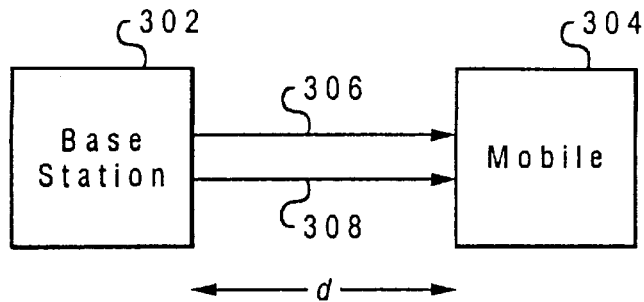
FIG. 3 depicts a block diagram of communications between a mobile unit and a cell repeater in accordance with a preferred embodiment of the present invention.

With reference now to FIG. 3, a block diagram of communications between a mobile unit and a cell repeater in accordance with a preferred embodiment of the present invention is depicted. Base station 302 may be the base station for any cell depicted in FIG. 2. The signal path from cell base station 302 to a mobile unit 304 located a distance d away from base station 302 includes a forward link or channel 306 and a reverse link or channel 308 through an air interface between base station 302 and mobile unit 304. As mobile unit 304 moves away from base station 302, the transmit power requires to maintain the desired frame error rate (FER) increases. The transmitted power of mobile unit 304, $S_{trans}$, which is controlled by the reverse link power control loop, is limited to a value $S_{max}$. It may be assumed that the condition for call outage is that the required $S_{trans}$ for a base station to acceptably service a mobile unit exceeds $S_{max}$. The transmitted power $S_{trans}$ of a mobile unit is given by:

$$S_{trans} = S + PL(d) + Z$$

where both S and $S_{trans}$ are expressed in terms of decibel Watts (dB-W), S is the received power at the base station, PL(d) is the path loss at a distance d from the base station, including antenna gains, and Z is a random variable representing shadow fading.

Figure 4:
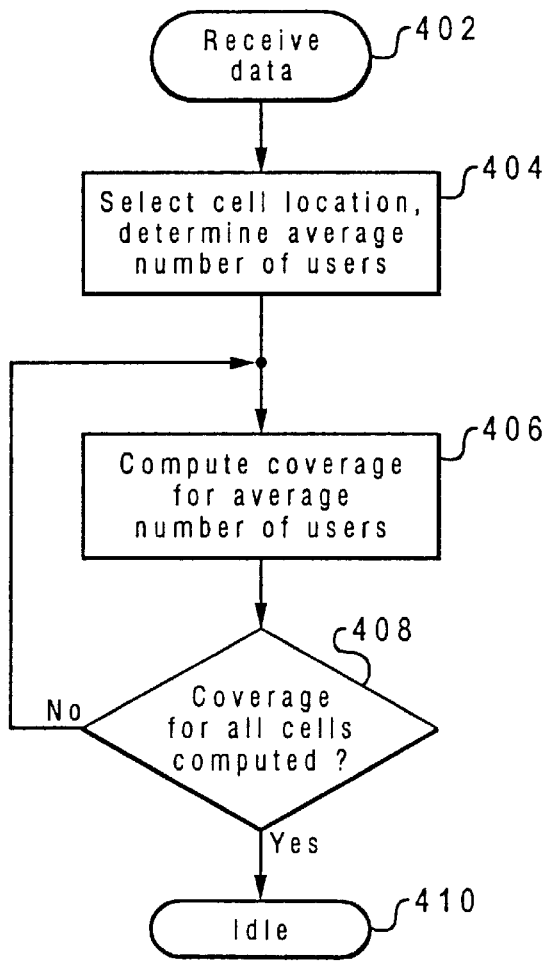
FIG. 4 is a high level flowchart for accurately calculating coverage of a cell within a CDMA wireless digital communications network as a function of capacity in accordance with a preferred embodiment of the present invention.

Referring now to FIG. 4, a high level flowchart for accurately calculating coverage of a cell within a CDMA wireless digital communications network as a function of capacity in accordance with a preferred embodiment of the present invention is illustrated. The cell coverage determined by the depicted process may be employed to define cell locations and boundaries for the cells of a network such as that depicted in FIG. 2. The process begins at step 402, which depicts receiving data regarding expected usage within the region of the CDMA network. Such data may come from a variety of sources, such as monitoring existing wireless networks in the area and/or marketing data. The process next passes to step 404, which illustrates selecting a cell location within the CDMA network and determining the average number of users for the area of that cell location.

The process then passes to step 406, which depicts computing coverage for the expected average number of users in the cell region as described below. In the equations below, where any variable X represents power or signal-to-noise ratio (SNR) in decibels (dB), the notation $\hat{X}$ is employed to denote the computation of $10^{X/10}$ for that power or SNR variable.

The probability of outage at a distance d from a base station is given by $$\text{Prob}(S + PL(d) + Z > S_{max})$$

where S is the required received power at the base station for maintaining FER for the intended user, and $S_{max}$ is the limit of transmitted power from the mobile unit as defined by the reverse link power control loop. If a model such as Hata's model is assumed for the path loss, $PL(d) = K_1 + K_2 \log d$. The shadow fading variable Z~Gaussian $(0, \sigma_Z^2)$. The term $\sigma_Z^2$ is used to denote a measure of the variance of the shadow fading process.

The equation above implies that the coverage $R_{cell}$ of the cell is obtained as a solution to:

$$\text{Prob}(S + PL(R_{cell}) + Z > S_{max}) = P_{out} \quad (1)$$

where $P_{out}$ is the desired outage probability at the edge of the cell. In equation (1) above, the only quantity which depends upon the number of users in the system is the required received power at the base station, S. Thus, a relationship between coverage and the number of users c in a system may be derived if the distribution of the base station required received power S as a function of the number of users c may be found.

The signal-to-noise ratio for the intended user at the base station may be expressed in terms of the received powers of the various users, as:

$$\hat{\varepsilon} = \left(\frac{\hat{E}_b}{I_0}\right)_{req} = \frac{\frac{\hat{S}}{R}}{\sum_{i=1}^{k-1} \frac{v_i \hat{S}_i}{W} + N_0} \quad (2)$$

where $\hat{\varepsilon}$ is the required SNR for maintaining a desired FER for a user, $\hat{E}_b$ is energy per bit, $I_0$ is interference energy density, R is the information bit rate in bits per second, $\hat{S}$ is the received power required at the base station for maintaining FER for the user of interest, k is the effective number of users seen by the base station, $\hat{S}_i$ is the received power required at the base station for maintaining FER for another user i, $v_i$ is the voice activity factor of the i-th user in the system, W is the system bandwidth, and $N_0$ is the background thermal noise density within the cell. The effective number of users k~Poisson$(c(1+f)|(k \geq 1))$, where c is the average number of users in a cell and $f$ is the other-cell interference factor for a cell. The voice activity factor $v_i$~Bernoulli$(\rho)$.

If it is assumed that all users are being maintained at the same FER on average, then it is clear that $\hat{S}, \hat{S}_1, \hat{S}_2, \ldots, \hat{S}_{k-1}$ are all independent, identically distributed (i.i.d.) random variables. Furthermore, it has been observed in field trials that imperfect power control and variations due to fading cause the required SNR $\hat{\varepsilon}$ to fluctuate randomly with log-normal first order statistics. These field trials have therefore shown that $\hat{\varepsilon}$ is log-normal, which means that $\varepsilon = 10 \log \hat{\varepsilon}$ is Gaussian with mean $m_\varepsilon$ and standard deviation $\sigma_\varepsilon$. Typical values for the mean $m_\varepsilon$ and standard deviation $\sigma_\varepsilon$ of $\varepsilon$ are $m_\varepsilon = 7$ Db and $\sigma_\varepsilon = 2.5$ dB. Therefore, if the terms $m_{\hat{\varepsilon}}$ and $\delta_{\hat{\varepsilon}}$ may be used to denote the mean and second moments, respectively, of $\hat{\varepsilon}$, it may be shown that $$m_{\hat{\varepsilon}} = \exp\left(\frac{(\beta\sigma_\varepsilon)^2}{2}\right)\exp(\beta m_\varepsilon)$$

and $$\delta_{\hat{\varepsilon}} = \exp(2(\beta\sigma_\varepsilon)^2)\exp(2\beta m_\varepsilon)$$

where $\beta = 10 \log_e 10$.

Equations for all of the moments of $\hat{S}$ may thus be obtained by taking expectations of appropriate powers in equation (2) above. A moment analysis using four moments reveals that $\hat{S}$ is very well approximated by a log-normal random variable. Thus, only the mean and second moment of $\hat{S}$ need to be calculated. These are given by:

$$m_{\hat{S}}(c) = \frac{N_0 W m_{\hat{\varepsilon}}}{\frac{W}{R} - \rho\left(\frac{c(1+f)}{1-e^{-c(1+f)}} - 1\right)m_{\hat{\varepsilon}}} \quad (3)$$

and $$\delta_{\hat{S}}(c) = \frac{\left[\left(N_0 W + \rho\left(\frac{c(1+f)}{1-e^{-c(1+f)}} - 1\right)m_{\hat{S}}\right)^2 + \rho^2\left(1 - \frac{(c(1+f))^2 e^{-c(1+f)}}{(1-e^{-c(1+f)})^2}\right)m_{\hat{S}}^2\right]\delta_{\hat{\varepsilon}}}{\left(\frac{W}{R}\right)^2 - \rho\left(\frac{c(1+f)}{1-e^{-c(1+f)}} - 1\right)\delta_{\hat{\varepsilon}}}$$

where $\rho$ is the voice activity factor for each user. When c is larger than 1, the above simplifies to $$\delta_{\hat{S}}(c) \approx \frac{[(N_0 W + \rho(c(1+f) - 1)m_{\hat{S}})^2 + \rho^2 m_{\hat{S}}^2]\delta_{\hat{\varepsilon}}}{\left(\frac{W}{R}\right)^2 - \rho(c(1+f) - 1)\delta_{\hat{\varepsilon}}}.$$

Since $\hat{S}$ is log-normal, S is Gaussian and the mean and variance of S may be easily calculated in terms of $m_{\hat{\varepsilon}}$ and $\delta_{\hat{\varepsilon}}$ as given below:

$$m_S(c) = 2 \log m_{\hat{S}}(c) - \frac{1}{2}\log \delta_{\hat{S}}(c)$$

and $$\sigma_S^2(c) = \frac{\log \delta_{\hat{S}}(c) \log e}{20} - \frac{m_{\hat{S}}(c) \log e}{10}.$$

In order to evaluate the probability on the left hand side of equation (1) above, the joint statistics of S and Z must be determined. Because the means and variances of these variables have been specified, all that remains to be determined in the correlation between the two variables. Fluctuations in the required received power S are mainly due to multipath fading and imperfections in power control. Fluctuations in Z, on the other hand, are due to shadow fading. Therefore, it may be argued that the correlation between S and Z is close to zero, and equation (1) above may be rewritten as:

$$Q\left(\frac{S_{\max} - (K_1 + K_2 \log R_{cell}) - m_S(c)}{\sqrt{\sigma_S^2(c) + \sigma_Z^2}}\right) = P_{out}, \quad (4)$$

where Q is the well-known Q-function related to error probability. From equation (4), the following explicit equation relating coverage $R_{cell}$ to the average number of users c may be obtained:

$$\log R_{cell} = \frac{S_{\max} - \left(\sqrt{\sigma_S^2(c) + \sigma_Z^2}\right)Q^{-1}(P_{out}) - m_S(c) - K_1}{K_2}. \quad (5)$$

The mean of a log-normal random variable is always positive. Thus it is clear from equation (3) above that, for a given set of system parameters, c may not exceed the value for which the denominator of equation (3) equals zero. The parameter $c_{pole}$ may therefore be defined to denote the value of c for which the denominator of equation (3) is zero, which is $$c_{pole} = \frac{\left(\frac{W}{R m_{\hat{\varepsilon}} \rho} + 1\right)}{1 + f}.$$

As c approaches $c_{pole}$, the mean $m_S(c)$ approaches infinity. This implies that $m_S(c)$ also approaches infinity, which further implies that $R_{cell}$ approaches zero. This demonstrates that $c_{pole}$ is the limit on the average number of users which the system can support, and also that $c_{pole}$ is achieved when the coverage of the cell is allowed to shrink to zero. This limit may be defined as the pole capacity of the system. It is noteworthy that this upper limit on c is applicable regardless of the admission policy employed.

Once the cell coverage has been computed based on expected average number of users for the cell region, the process passes to step 408, which depicts a determination of whether the coverage for all cells in the network have been computed. If not, the process returns to step 404 for selection of another cell location within the network. If so, however, the process proceeds instead to step 410, which illustrates the process becoming idle.

The process has been described in the context of selecting boundaries for cells within a wireless communications system. However, within an existing digital communications network, the equations derived above may be applied to the calculation of a probability of outage for a mobile unit within a given cell having a known or measurable average number of users. Equation (4) may be utilized with the distance d of the mobile unit from the base transceiver station for the cell within which the mobile unit is operating being substituted for the radius of the cell $R_{cell}$. The remainder of equation (4) may be utilized as written for an accurate calculation of the probability of outage.

Figure 5:
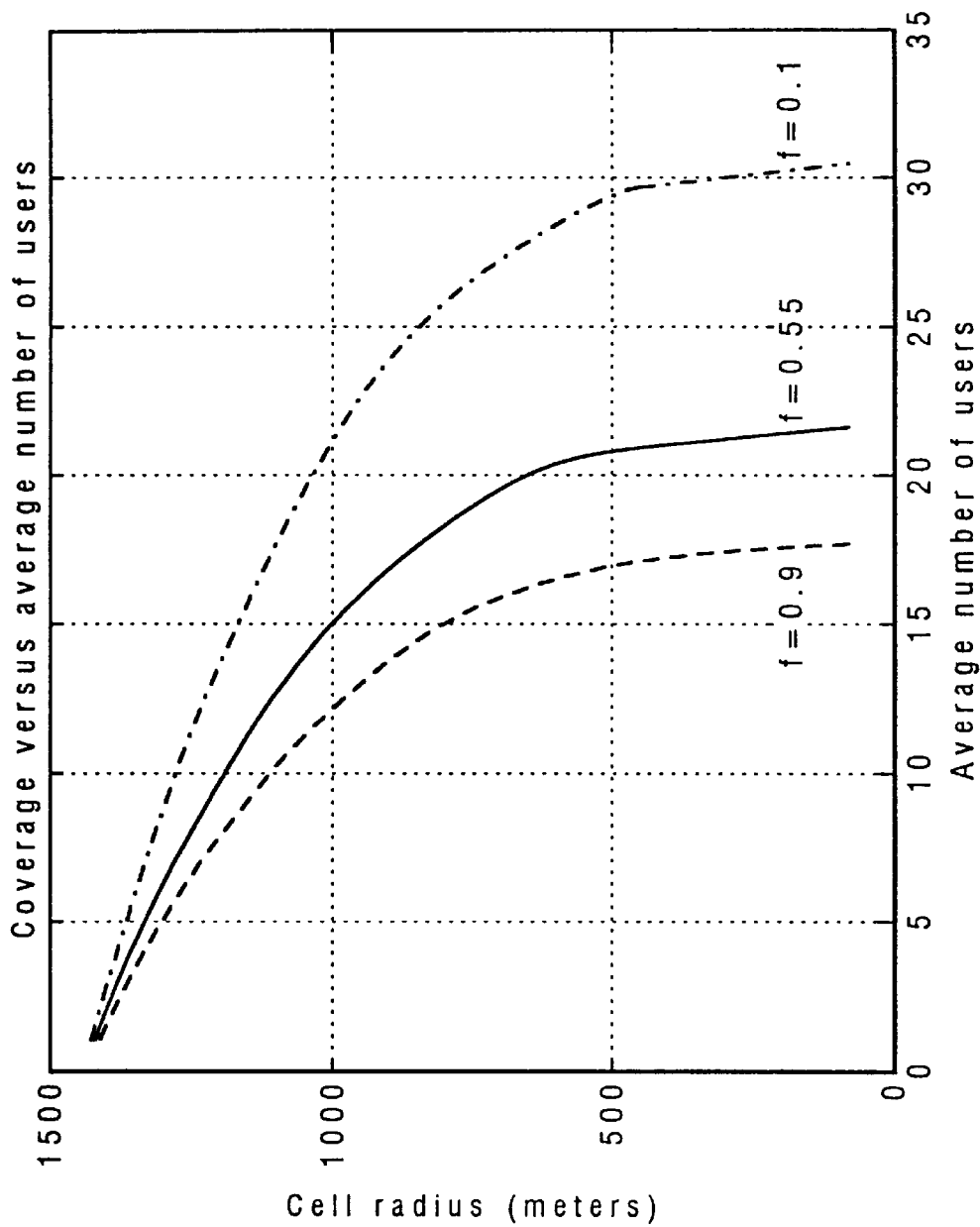
FIG. 5 depicts a plot of cell coverage calculated for various setups of a CDMA system as a function of an average number of users in accordance with a preferred embodiment of the present invention.

With reference now to FIG. 5, a plot of cell coverage calculated for various setups of a CDMA system as a function of an average number of users in accordance with a preferred embodiment of the present invention is illustrated. A few parameters for a CDMA system may be fixed and will not change from setup to setup, such as $S_{max}$, $P_{out}$, W, etc. Other parameters, however, have values which depend on the environment in which the cell is located, including $K_1$, $K_2$, $\sigma_Z^2$, etc. The plot depicted shows cell coverage versus average number of users for a system located in a dense urban environment, with a carrier frequency equal to 1.9 GHz, a cell antenna height equal to 100 m, and a data rate equal to 14.4 Kbps. The plot depicted reflects an inverse relationship between cell coverage and capacity, with interference from other cells having greater impact in smaller cells.

It should be noted that, while described in the context of cells, the present invention may also be employed in the context of cell sectors. In a typical wireless communications network, each cell is usually divided into a number of sectors, generally either three (120° sectors) or six (60° sectors), with multiple base transceiver stations having directional antennas employed to service each sector. The equations derived above have no dependence on a particular geometry, but depend only on the distance of a user from the transceiver and the number of users within the area serviced by that transceiver. Therefore, the present invention may be readily applied to calculating the probability of outage in a cell sector or the capacity versus coverage of a cell sector.

The present invention provides an explicit relationship between cell coverage and average number of users in determining cell locations and boundaries. This allows an optimal design of a CDMA network, since it gives a closed form expression for the tradeoff between coverage and carried traffic.

The approach of the present invention decouples the admission policy from cell coverage considerations. In general, the admission policy will result in some probability of call blocking such that the average number of users (i.e., carried traffic) equals the offered traffic times one minus the probability of blocking. Thus, incorporating the blocking probability into the coverage problem makes the result dependent on the admission policy. In the present invention, however, the coverage problem is concerned only with the average number of users in the system and is independent of which admission policy is employed to achieve that number.

It is important to note that while the present invention has been described in the context of a fully functional communications system, those skilled in the art will appreciate that the mechanism of the processes of the present invention is capable of being distributed in the form of a computer readable medium of instructions in a variety of forms, and that the present invention applies equally regardless of the particular type of signal bearing media used to actually carry out the distribution. Examples of computer readable media include: recordable type media such as floppy disks and CD-ROMs and transmission type media such as digital and analog communication links.

The description of the preferred embodiment of the present invention has been presented for purposes of illustration and description, but is not intended to be exhaustive or limit the invention in the form disclosed. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

What is claimed is:

1. A method of selecting boundaries for cells within a wireless communications system, comprising:

identifying an expected average number of users for a cell within the wireless communications system, wherein a base transceiver station is associated with the cell;

determining a coverage provided by the base transceiver station with a selected probability of outage for the expected average number of users, wherein the coverage is less than a pole capacity of the cell;

designating boundaries for the cell using the coverage determined for the base transceiver station.

2. The method of claim 1, wherein the step of determining a coverage provided by the base transceiver station with a selected probability of outage for the expected average number of users further comprises:

determining a required received power from the expected average number of users within the cell.

3. The method of claim 1, wherein the step of determining a coverage provided by the base transceiver station with a selected probability of outage for the expected average number of users further comprises:

determining the coverage provided by the base transceiver station from $$\log R_{cell} = \frac{S_{\max} - \left(\sqrt{\sigma_S^2(c) + \sigma_Z^2}\right) Q^{-1}(P_{out}) - m_S(c) - K_1}{K_2}.$$

4. A wireless communications system, comprising:

a plurality of contiguous cells, each cell within the plurality of cells having a coverage providing a selected probability of outage for an expected average number of users within the respective cell, wherein the selected probability of outage is determined from a probability that a required received power, a path loss, and a shadow fading for a mobile unit within the cell cumulatively exceed a limit of transmitted power defined by a reverse link power control loop.

5. The wireless communications system of claim 4, wherein the expected average number of users for each cell within the plurality of cells is less than a pole capacity for the respective cell.

6. The wireless communications system of claim 4, wherein the selected probability of outage is determined from a probability of $$Q\left(\frac{S_{\max} - (K_1 + K_2 \log R_{cell}) - m_S(c)}{\sqrt{\sigma_S^2(c) + \sigma_Z^2}}\right).$$

7. The wireless communications system of claim 4, further comprising:

a base transceiver station within each cell within the plurality of cells; and at least one switch, wherein base transceiver stations for cells within the plurality of cells are connected to the at least one switch.

8. The wireless communications system of claim 4, wherein the wireless communications system is a code division multiple access system.

9. A cell within a wireless communications system, comprising:

a base transceiver station providing communications for an expected average number of users within the cell with a selected probability of outage, wherein the base transceiver station provides a signal path including a forward link and a reverse link through an air interface to mobile units for the expected average number of users.

10. The cell of claim 9, wherein the selected probability of outage is determined from a probability that a required received power, a path loss, and a shadow fading for a mobile unit within the cell cummulatively exceed a limit of transmitted power defined by a reverse link power control loop.

11. The cell of claim 9, wherein the selected probability of outage is determined from a probability of $$Q\left(\frac{S_{\max} - (K_1 + K_2 \log R_{cell}) - m_S(c)}{\sqrt{\sigma_S^2(c) + \sigma_Z^2}}\right).$$

12. The cell of claim 9, wherein a coverage for the cell is determined by $$\log R_{cell} = \frac{S_{\max} - \left(\sqrt{\sigma_S^2(c) + \sigma_Z^2}\right) Q^{-1}(P_{out}) - m_S(c) - K_1}{K_2}.$$

13. The cell of claim 9, wherein the expected average number of users is less than a pole capacity for the cell.

14. The cell of claim 9, wherein the base transceiver station is configured for operation in a code division multiple access wireless communications system.

15. A computer program product for use with a data processing system, comprising:
    a computer usable medium;
    first instructions on said computer usable medium for receiving an expected average number of users for a cell within the wireless communications system, wherein a base transceiver station is associated with the cell;
    second instructions on said computer usable medium for determining a coverage provided by the base transceiver station with a selected probability of outage for the expected average number of users; and
    third instructions on said computer usable medium for designating boundaries for the cell using the coverage determined for the base transceiver station.

16. The computer program product of claim 15, wherein the second instructions further comprise:
    instructions for determining a required received power from the expected average number of users within the cell.

17. The computer program product of claim 15, wherein the second instructions further comprise:
    instructions for determining the coverage provided by the base transceiver station from $$\log R_{cell} = \frac{S_{\max} - \left(\sqrt{\sigma_S^2(c) + \sigma_Z^2}\right) Q^{-1}(P_{out}) - m_S(c) - K_1}{K_2}.$$

* * * * *